Sept. 26, 1933.　　　　V. I. ZELOV　　　　1,928,278
TEMPERATURE INDICATING DEVICE
Filed March 19, 1932
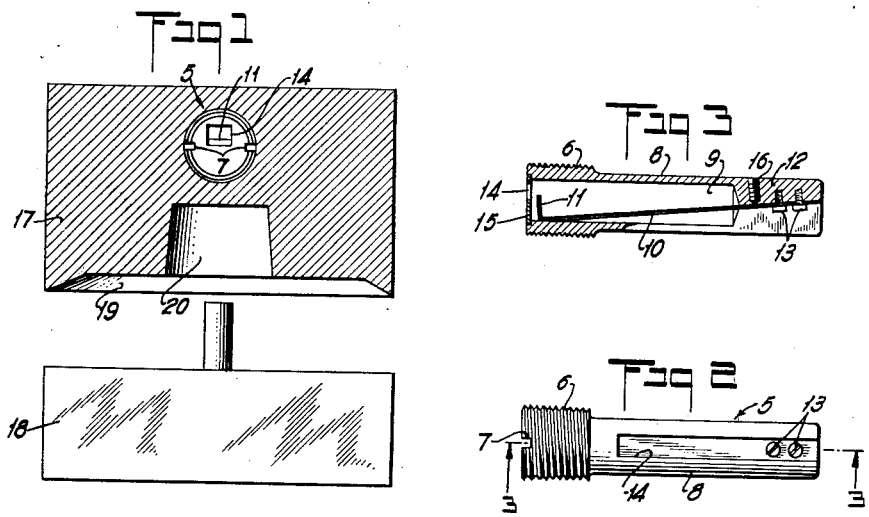
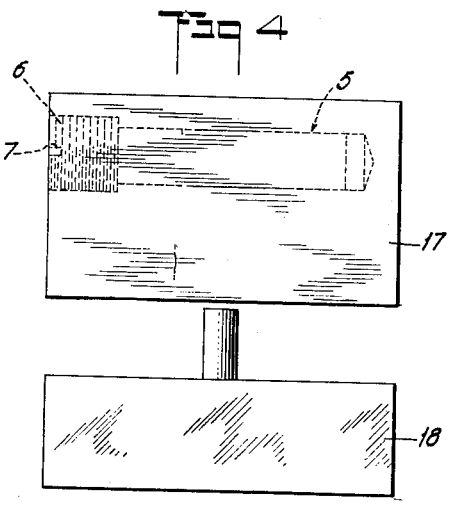
INVENTOR.
VICTOR I. ZELOV.
BY Stephen Cerstvik
ATTORNEY.

Patented Sept. 26, 1933

1,928,278

UNITED STATES PATENT OFFICE 1,928,278

TEMPERATURE INDICATING DEVICE

Victor I. Zelov, Rosemont, Pa., assignor to Bendix Aviation Corporation, South Bend, Ind., a corporation of Delaware Application March 19, 1932. Serial No. 600,039

6 Claims. (Cl. 116—114)

The present invention relates to indicating devices and more particularly to temperature indicating devices adapted to be readily inserted into and made a part of the object whose temperature is to be indicated.

Heretofore, it has been the practice in obtaining the temperature of an object as, for example, of one of the matrices of a mold, to place a measuring instrument embodying a thermocouple adjacent to the exterior surface of the object and indicating the temperature on an electric meter, as, for example, a millivolt meter connected to and operated by the thermo-couple. With such an arrangement, however, the true or internal temperature of the matrix would not be indicated, which in molds and other similar objects is of greater importance than the exterior temperature.

Accordingly one of the objects of the present invention is to provide a novel temperature indicating device which can be readily inserted into the interior of the object whose temperature is to be indicated and the reading obtained from the exterior thereof.

Another object is to provide a novel device of the above type including means for adjusting the temperature responsive element of the device for a predetermined range of temperatures.

A further object of the invention is to provide a novel temperature indicating device embodying a temperature responsive element which may be readily associated with and/or disassociated from the interior of the object whose temperature is to be indicated, and the indicating portion of which is clearly visible from the exterior surface of the object while the device is associated with the latter.

A still further object is to provide a temperature indicating device embodying a novel construction whereby it can be easily and economically made in large quantities since relatively few parts are involved therein.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only and is not designed as a definition of the limits of the invention, reference being had for this purpose to the appended claims.

In the drawing wherein like reference characters refer to like parts throughout the several views, Fig. 1 is an elevational view, partly in section, of one form of apparatus to which the device of the present invention may be applied;

Fig. 2 illustrates one form of the device embodying the present invention;

Fig. 3 is a sectional view of the device taken on line 3—3 of Fig. 2; and

Fig. 4 is a side view of the apparatus shown in Fig. 1, as viewed from the right of the latter figure, and showing the relation of the temperature indicating device with respect to the object whose internal temperature is to be indicated.

In accordance with the invention, the novel temperature indicating device is embodied in the form of a plug or cartridge having a temperature responsive element therein such as, for example, a bi-metallic strip and arranged to be plugged or screwed in place in an opening specifically provided for this purpose in the apparatus or object whose internal temperature is to be indicated. The device is particularly suitable for use in plastic molding to determine the inside temperature of the molds so that a molder can determine quickly and relatively accurately the temperature at which a mold is operating. Such a device is a desirable part of the molder's equipment to check actual temperature so that he can set the controls of his heating media for the molds accordingly.

The device, as pointed out above, is arranged to be plugged or screwed into the mold and the indicator is operatively connected with the thermostatic element so that it will register by showing a selected color to the operator whereby he can determine at a glance whether the mold is too hot or too cold. The device may be made so that it can be readily adjusted according to the desired temperature, or it may be manufactured in groups already set for various ranges of temperature so that if one temperature range is desired a device calibrated for that particular range is plugged into the mold, and if it is desired to change the temperature range the device is removed and another device having a different temperature range inserted in its place.

Referring to the drawing, the device embodying the present invention is shown in the form of a plug 5 having a threaded portion 6 provided with a transverse slot or groove 7 and an elongated cylindrical portion 8 which is adapted to extend into an opening provided in the object or apparatus whose internal temperature is to be indicated and rigidly secured thereto by means of said threaded portion 6. A portion of the interior of the plug is made hollow to provide a chamber 9 through which extends longitudinally a bi-metallic strip 10 and at an angle to the axis of the plug or cartridge 5. The strip 10 is provided with a projecting portion 11 bent at substantially a right angle to the main portion and has its opposite end secured to a solid portion 12 of the plug in any suitable manner as by means of screws 13. The bi-metallic strip may be inserted into the plug through a longitudinal opening or slot 14 provided in the cylindrical portion 8 of said plug, and the bent portion 11 of the bi-metallic strip is so arranged that upon a change in temperature it is moved into such a position as to be viewed through an opening 14 provided in a disc 15 which is inserted into the threaded end 6 of the plug for closing the chamber 9. The face of the projection 11, which becomes visible through the opening 14, may be colored in any suitable color as, for example, red to indicate that the required temperature has been reached when the projection 11 is in full view in the opening 14 due to the deformation of the bi-metallic strip 10 produced by a change in temperature.

It will thus be apparent that as the internal temperature of the object within which the plug 5 is inserted, is changed, the projection 11 will be moved toward the opening 14 thereby exposing more or less of the colored surface thereof depending on the extent of the temperature variation. A different plug or cartridge 5 may be furnished for different temperature ranges, each plug being capable of indicating any desired variations in its particular range, and the range may then be changed by substituting a plug having a bi-metallic strip of different temperature characteristics.

What is claimed is:

1. A temperature indicating device comprising a plug or cartridge adapted for insertion into the object whose temperature is to be indicated and having means at one end thereof for securing it to the object without having any portion thereof projecting from said object, means forming a window at the exposed end of the device, a bi-metallic strip arranged longitudinally at an angle within said plug and having one end thereof secured to the plug and its other end free to be moved in response to temperature changes so that the latter end may be viewed through the window to indicate the temperature, and means for varying the temperature characteristics of the bi-metallic strip to change the temperature range of the device.

2. A temperature indicating device comprising a plug or cartridge adapted for insertion into the object whose temperature is to be indicated and having means at one end thereof for securing it to the object without having any portion thereof projecting from said object, means forming a window at the exposed end of the device, and a bi-metallic strip arranged longitudinally at an angle within said plug, and having one end thereof secured to the plug and its other end free to be moved in response to temperature changes so that the latter end may be viewed through the window to indicate the temperature.

3. A device for indicating the internal temperature of an object, comprising a cartridge or plug adapted to be inserted into an opening provided in the object whose temperature is to be indicated, and temperature responsive means within said plug and including means fixed to one end of said temperature responsive means and movable as a unit therewith for directly indicating the desired temperature.

4. A device for indicating the internal temperature of an object, comprising a cartridge or plug adapted to be inserted into an opening provided in the object whose temperature is to be indicated, and temperature responsive means within said plug and having means thereon and movable as a unit therewith for directly indicating the desired temperature through an opening provided at one end of the plug.

5. A temperature indicating device having the form of a cartridge or plug adapted for insertion into the object whose temperature is to be indicated, and a temperature responsive element within said plug and having indicating means fixed thereto and movable as a unit in synchronism therewith, said means being visible from the exposed end of the plug.

6. A temperature indicating device having the form of a cartridge or plug adapted for insertion into the object whose temperature is to be indicated, a temperature responsive element within said plug and having indicating means fixed thereto and movable as a unit in synchronism therewith, said means being visible from the exposed end of the plug, and means for varying the temperature range of said temperature responsive element.

VICTOR I. ZELOV.